No. 888,313. PATENTED MAY 19, 1908.
F. B. COOK.
GUY CLAMP.
APPLICATION FILED MAY 11, 1907.

2 SHEETS—SHEET 1.

WITNESSES: Frederick P. Parker. Bert G. Gable.

INVENTOR Frank B. Cook.

No. 888,313. PATENTED MAY 19, 1908.
F. B. COOK.
GUY CLAMP.
APPLICATION FILED MAY 11, 1907.
2 SHEETS—SHEET 2.
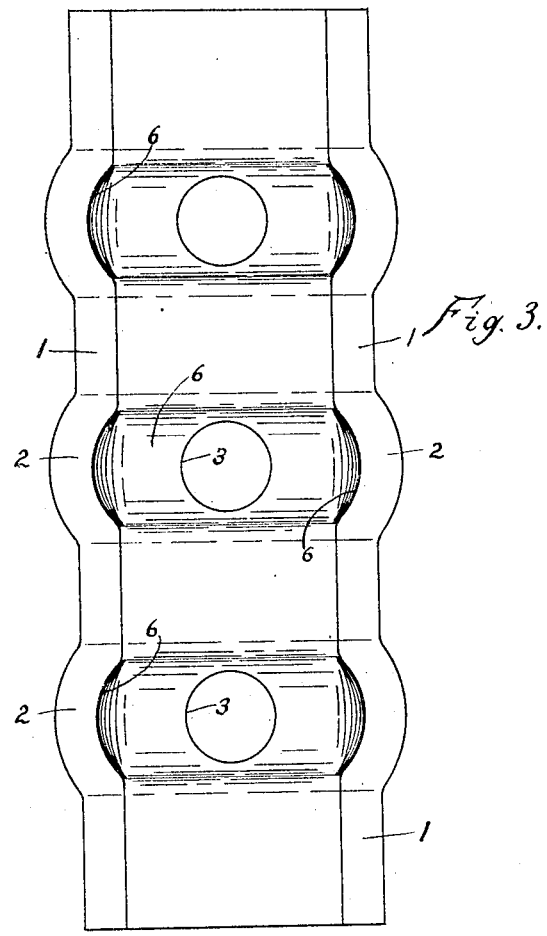
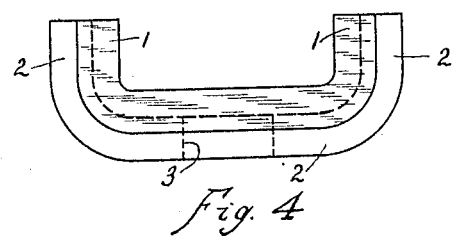
WITNESSES: Frederick R. Parker. Bert G. Gable.
INVENTOR: Frank B. Cook.

UNITED STATES PATENT OFFICE.

FRANK B. COOK, OF CHICAGO, ILLINOIS.

GUY-CLAMP.

No. 888,313.         Specification of Letters Patent.         Patented May 19, 1908.

Application filed May 11, 1907. Serial No. 373,139.

*To all whom it may concern:*

Be it known that I, FRANK B. COOK, a citizen of the United States of America, residing at Chicago, in the county of Cook and State of Illinois, have invented a new and useful Guy-Clamp, of which the following is a specification, reference being had to the accompanying drawings, illustrating same.

My invention relates to clamps for holding any kind of strands or ropes and clamping same so as to secure two pieces of the strands or ropes therein and hold same against longitudinal movement due to tensional stresses put on the strands or ropes tending to pull them apart.

The principal objects of my invention are to provide a clamp which has increased holding power on the strands or ropes, over clamps heretofore made; to provide a clamp in which but one jaw portion is used instead of the two jaw portions generally used; to provide a clamp in which any slipping of the strands or ropes tends to tighten the clamping means on the said strands or ropes and thereby increase the holding power of the clamp; and to provide simplicity of construction and cheapness of manufacture in such a clamp. Other objects will be apparent from the following specification.

In clamps heretofore used it is generally customary to provide two jaw portions with grooves therein in which grooves the strands or ropes are clamped between the said jaw portions. In such a clamp there are two jaw portions required besides the necessary bolts for clamping the jaw portions together.

In the clamp of my present invention I provide but one jaw portion and form it in the shape of a trough and then provide wedge-shaped bolts extending through the bottom of the trough to wedge in between the strands or ropes and wedge the latter out into recesses formed in the sides of the trough. With this construction the cost of manufacture is greatly cheapened and the holding power is greatly increased by the wedge-shaped bolts which can be easily tightened up by nuts on the bottom side of the trough so as to put great pressure on the strands or ropes to wedge them in place in the recesses in the trough.

Figure 1:
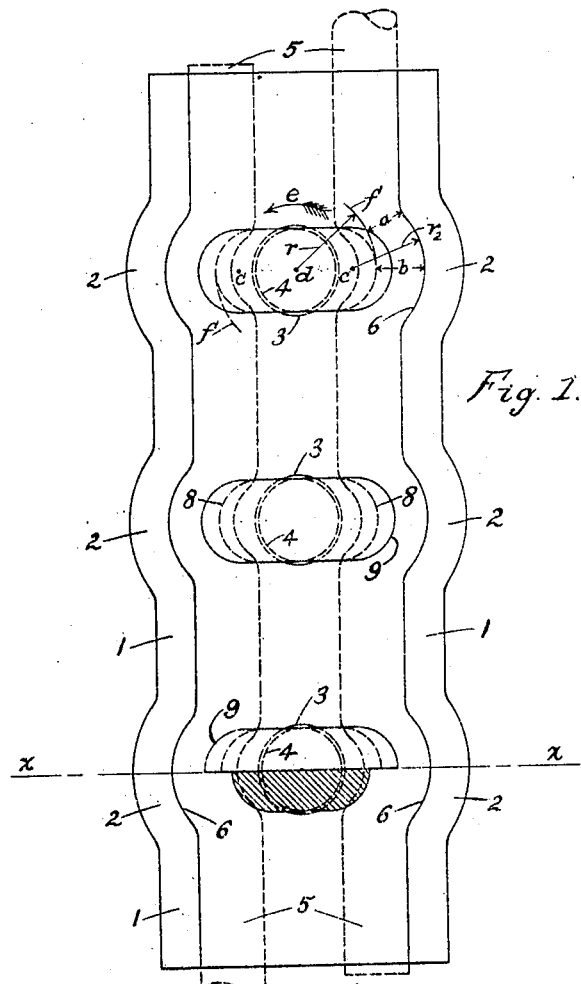
Figure 2:
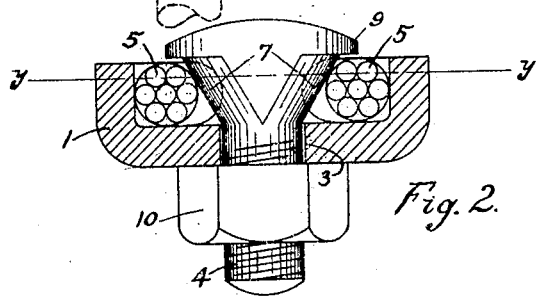

In the drawings illustrating the preferred form of my invention, Figure 1 is a front elevation of a clamp embodying the features of the invention, with a portion of one of the clamping bolts shown in cross-section taken on line $y\ y$ of Fig. 2; Fig. 2 is a transverse cross-sectional view of the clamp shown in Fig. 1, taken on line $x\ x$ of Fig. 1, with the clamping bolt shown in elevation; Fig. 3 is a front elevation of another form of clamp embodying the features of the invention, with the clamping bolts removed; and Fig. 4 is an end elevation of the portion shown in Fig. 3.

Like characters refer to like parts in the several figures.

The body portion 1 of the clamp is made of a piece of metal, preferably sheet-metal, formed into a trough-like shape with the side portions bulged out as at 2 2. Between each pair of bulged-out portions 2 2 is provided a hole 3 through the bottom of the trough, through which a clamping bolt 4 extends. The portion 1 is made strong enough to resist considerable pressure tending to force the side portions outward. If desired the bulged-out portions 2 2, may extend clear across the bottom portion of the trough-like portion 1, as shown in Figs. 3 and 4, as well as at the sides of the trough-like portion. Each clamping bolt 4 is provided with a wedge-shaped head adapted to lie between the strands or ropes 5 5 so as to wedge the latter out against the sides of the trough-like portion and into the recesses 6 6 formed by the bulged-out portions 2 2. Each wedging face 7 of each bolt 4 is preferably semicylindrical in form, as shown in Fig. 2 and by lines 8 8 of Fig. 1, so as to provide a smooth bearing surface for the strands or ropes 5 5 and not indent or injure the latter when they are wedged out into the recesses 6 6. Each bolt 4 is also preferably provided with a head portion 9 which serves to keep the strands or ropes 5 5 from coming clear out of the trough when the bolts 4 4 are loosened slightly. The inner surface 6 of each recess in the sides of the trough-like portion is scribed from $c$ as a center, with a radius $r^2$, and each semicircular element of the semicylindrical surface 7 of each clamping bolt 4 is scribed with a radius equal to half the diameter of bolt 4. $c$ is located in a plane containing the longitudinal axis of bolt 4 and extending at right angles to the length of the clamp, away from the said axis of bolt 4. If a bolt 4 be turned in the direction of arrow $e$ as shown in Fig. 1, each one of the said elements would be rotated about *d* as a center, the outermost portion of each of said elements scribing an arc of a circle, as *f* from a radius *r*. *d* lies in the longitudinal axis of bolt 4. The surface 6 being scribed from *c* as a center and the arc *f* being scribed from *d* as a center, necessarily makes a shorter distance between 6 and *f*, at *a* than at *b*. Consequently if the bolt 4 be turned in the direction of arrow *e*, each element of the wedging face 7 of the bolt will approach the surface 6 as the bolt 4 is turned. It will readily be seen that with this construction, when the strands or ropes are put in place in the clamp as shown in the drawings, any turning of the bolts 4 4 afterward are wedged in between the strands, wedges the strands or ropes 5 5 tighter between the wedging surfaces 7 7 of the bolts and the surfaces 6 6 of the recesses in the trough-like portion. Therefore when a tensile stress is put upon the strands or ropes tending to pull them apart, the bolts 4 4 have the effect of wedging the strands or ropes still tighter in the clamp if they begin to slip in the least. With the form of bolts shown in the drawings the strands or ropes can be easily wedged out into the recesses 6 6 by turning up the nuts 10 10, as a great side pressure against the strands or ropes can be obtained by a reasonable longitudinal pull on the bolts, produced by tightening up the nuts 10 10.

When it is desired to clamp the strands or ropes 5 5 in the clamp, the heads 9 9 of the bolts 4 4 may be all turned lengthwise of the clamp and the strands or ropes 5 5 laid in the clamp on opposite sides of the bolts 4 4 in straightened out positions. Then the bolts 4 4 may be turned crosswise of the clamp as shown in the drawings and the nuts 10 10 tightened up whereby the strands or ropes 5 5 are tightly wedged out into the recesses 6 6 as shown in the drawings. If the recesses 6 6 extend across the bottom of the trough-like portion also, the strands or ropes 5 5 will be wedged downward as well as outward when the nuts 10 10 are tightened up. It will readily be seen that a great holding power on the strands or ropes 5 5 may be obtained by such a clamp, and that the cost of manufacture is greatly reduced in using one clamping jaw where two are generally used.

I do not wish to limit this invention to the particular details of construction as herein shown, as many modifications may be made within the scope of the invention.

It will be readily understood that the clamps of this invention may be made in various sizes, as, for instance, in 1-bolt, 2-bolt or 3-bolt sizes.

What I claim as new and desire to secure by Letters Patent is:

1. A clamp of the character described comprising a trough-like portion having recesses in the sides thereof, and a bolt extending through the trough-like portion and having wedge-shaped portions thereon disposed transversely regarding the trough, the surfaces of the said recesses being formed so that any turning of the bolt causes the wedge-shaped portions to approach the surfaces of the said recesses, for purposes substantially as described.

2. A clamp of the character described comprising a trough-like portion having a recess in the side thereof, and a bolt extending through the trough-like portion and having an enlarged portion thereon disposed transversely regarding the trough, the surface of the said recess being formed so that turning the bolt causes the said enlarged portion to approach the surface of the said recess, for purposes substantially as described.

3. A clamp of the character described comprising a trough-like portion having a recess in the side thereof, a bolt extending through the trough-like portion, and a clamping member disposed transversely regarding the trough and held in place by the said bolt, the surface of the said recess being formed so that any turning of the clamping member causes same to approach the surface of the said recess, substantially as described.

4. A clamp of the character described comprising a trough-like portion having a recess in the side thereof, and a clamping member suitably held within the trough and disposed substantially transversely regarding the trough, the said recess being formed so that turning the clamping member causes same to approach the surface of the recess.

5. A clamp of the character described comprising a trough-like portion having recesses in the sides thereof, a bolt extending through the trough-like portion, and a wedge shaped portion disposed transversely regarding the trough and held in place by the said bolt, the surfaces of the said recesses being formed so that any turning of the wedge-shaped portion causes same to approach the surfaces of the said recesses, substantially as described.

As inventor of the foregoing, I hereunto subscribe my name in the presence of two subscribing witnesses, this 6th day of May, 1907.

FRANK B. COOK.

Witnesses:
 FREDERICK R. PARKER,
 C. C. NEWBURN.